United States Patent [19]
Shattil

[11] Patent Number: 5,955,992
[45] Date of Patent: Sep. 21, 1999

[54] FREQUENCY-SHIFTED FEEDBACK CAVITY USED AS A PHASED ARRAY ANTENNA CONTROLLER AND CARRIER INTERFERENCE MULTIPLE ACCESS SPREAD-SPECTRUM TRANSMITTER

[76] Inventor: Steve J. Shattil, 4980 Meredith Way #201, Boulder, Colo. 80303

[21] Appl. No.: 09/022,950

[22] Filed: Feb. 12, 1998

[51] Int. Cl.$^6$ .................................................. H01Q 3/22
[52] U.S. Cl. ........................... 342/375; 342/372; 372/23; 372/28
[58] Field of Search .................................. 342/368, 371, 342/372, 375; 372/25–26, 23, 28, 99; 250/201.9; 370/277–278, 281, 310; 359/285, 287, 290, 305

[56] References Cited

U.S. PATENT DOCUMENTS

| | | | |
|---|---|---|---|
| 4,641,317 | 2/1987 | Fullerton | 375/1 |
| 4,743,906 | 5/1988 | Fullerton | 342/27 |
| 4,813,057 | 3/1989 | Fullerton | 375/37 |
| 4,827,480 | 5/1989 | Kowalski | 372/28 |
| 4,901,307 | 2/1990 | Gilhousen | 370/18 |
| 4,979,186 | 12/1990 | Fullerton | 375/23 |
| 5,003,545 | 3/1991 | Kowalski | 372/25 |
| 5,117,239 | 5/1992 | Riza | 342/375 |
| 5,132,694 | 7/1992 | Sreenivas | 342/373 |
| 5,187,487 | 2/1993 | Riza | 342/372 |
| 5,202,776 | 4/1993 | Gesell | 359/17 |
| 5,231,405 | 7/1993 | Riza | 342/375 |
| 5,260,968 | 11/1993 | Gardner | 375/1 |
| 5,274,381 | 12/1993 | Riza | 342/368 |
| 5,307,073 | 4/1994 | Riza | 342/372 |
| 5,329,248 | 7/1994 | Izadian | 330/295 |
| 5,333,000 | 7/1994 | Hietala | 342/368 |
| 5,363,108 | 11/1994 | Fullerton | 342/27 |
| 5,367,305 | 11/1994 | Volker | 342/368 |
| 5,432,522 | 7/1995 | Kurokami | 342/361 |
| 5,461,687 | 10/1995 | Brock | 385/37 |
| 5,471,647 | 11/1995 | Gerlach | 455/63 |
| 5,512,907 | 4/1996 | Riza | 342/375 |
| 5,515,060 | 5/1996 | Hussain | 342/376 |
| 5,515,378 | 5/1996 | Roy | 370/95.1 |
| 5,583,516 | 12/1996 | Lembo | 342/375 |
| 5,592,490 | 1/1997 | Barratt | 370/310 |
| 5,623,360 | 4/1997 | Gesell | 359/287 |
| 5,642,353 | 6/1997 | Roy | 370/329 |
| 5,677,697 | 10/1997 | Lee | 342/368 |
| 5,687,169 | 11/1997 | Fullerton | 370/324 |

OTHER PUBLICATIONS

Kowalski, Squier, Pinckney, "Pulse Generation With An Acousto–Optic Frequency Shifter In A Passive Cavity," Appl. Phys. Lett., vol. 50, No. 12, Mar. 23, 1987.

Shattil, "A New Method For Generating Short Optical Pulses", T–3513, Colorado School of Mines, Dec. 1987.

Kowalski, Hale, Shattil, "Broadband Continuous–Wave Laser", Optics Letters, vol. 13, No. 8, Aug. 1988 pp. 622–624.

Kowalski, Shattil, Hale, "Optical Pulse Generation With A Frequency Shifted Feedback Laser," Appl. Phys. Lett., vol. 53, No. 9, Aug. 29, 1988.

Jeuremouic, "Smart Antenna Systems for CDMA (15–95) Technology," Microwave Online Services Co., US West Advanced Technologies white paper.

Primary Examiner—Thomas H. Tarcza
Assistant Examiner—Dao L. Phan
Attorney, Agent, or Firm—Steve J. Shattil

[57] ABSTRACT

An optical processor for controlling a phased antenna array uses a frequency-shifted feedback cavity (FSFC), which includes a traveling-wave cavity. The FSFC incrementally delays and incrementally frequency shifts optical signals circulating in the traveling-wave cavity. Optical signals coupled out of the FSFC are separated by frequency, hence by delay, and processed to control either or both transmit and receive beam-forming operations. The FSFC provides a receiver with multiple receive signals which have incremental values of frequency. Each frequency corresponds to an incremental time sampling of optical signals input into the FSFC. Transmit signals coupled out of the FSFC have frequency and phase relationships that result in short time-domain pulses when combined. Controlling modulation and frequency of the transmit signals achieves carrier interference multiple access, a new type of spread-spectrum communications.

31 Claims, 13 Drawing Sheets

FREQUENCY-SHIFTED FEEDBACK CAVITY USED AS A PHASED ARRAY ANTENNA CONTROLLER AND CARRIER INTERFERENCE MULTIPLE ACCESS SPREAD-SPECTRUM TRANSMITTER

BACKGROUND OF THE INVENTION

I. Field of the Invention

The present invention relates to wireless communication and radar systems. More specifically, the present invention relates to a novel and improved antenna array processor that controls beam-forming and scanning operations and that also introduces a new spread spectrum technique.

II. Description of the Related Art

Multiple access communication techniques include time-division multiple access (TDMA), frequency division multiple access (FDMA), amplitude modulation, and spread spectrum. Spread spectrum techniques provide some improvements over the other multiple access techniques depending on the type of spread spectrum used. Spread spectrum techniques are based on the principle of expanding a transmitted baseband signal in frequency. This achieves superior interference-rejection by utilizing high process gain to reduce noise and interference in the received signal.

There are four basic types of spread spectrum. Frequency-hopping spread spectrum (FHSS) is a well-known technique that provides effective rejection of narrow-band jamming interference and mitigates near-far interference. Chirped FM spread spectrum is a technique used primarily in radar systems. Orthogonal frequency division multiplexing (OFDM) is used to spread high data-rate information streams into multiple low data-rate streams carried on separate carrier frequencies. Direct sequence CDMA (DS-CDMA) is particularly useful in multiple access communication systems because it allows for very efficient use of the frequency spectrum and provides for improved frequency reuse. There are also hybrid techniques that combine various aspects of the four basic spread spectrum types. Most notable are frequency-hopped direct sequence, time-division direct sequence, and orthogonal frequency CDMA (also known as multifrequency CDMA or MF-CDMA).

Frequency reuse is the process of using the same frequency in two separate geographic regions for two distinct communication links. Frequencies can be reused provided that the two regions are attenuated or isolated from each other by a minimum value for signal rejection by user receivers in each region. U.S. Pat. No. 4,901,307 describes the process of creating marginal isolation, which provides an increase in frequency reuse in DS-CDMA systems. In DS-CDMA, even small reductions in the overall power level of the system allow for increased system capacity. One particularly effective method for creating isolation and improving frequency reuse is spatial division multiple access (SDMA). SDMA applications to multiple access communication systems including adaptive array processing are discussed in U.S. Pat. No. 5,642,353, U.S. Pat. No. 5,592,490, U.S. Pat. No. 5,515,378, and U.S. Pat. No. 5,471,647. In addition to frequency reuse, antenna arrays also provide increased processing gain and improved interference rejection.

The advantage to using adaptive antenna arrays for DS-CDMA communications is that adaptive antenna arrays could provide significant improvements in range extension, interference reduction, and capacity increase. To identify a particular user, a DS-CDMA system demodulates Walsh codes after converting the received signal from RF to digital. Therefore, an adaptive antenna array requires information about the user codes from CDMA radio, or it needs to demodulate many different incoming RF signals to track mobile users. These methods are complex processes and are more difficult to implement than the tracking of users in non-CDMA systems. Major changes in CDMA radio architecture are required to implement adaptive array processing. These changes may be the major obstacle for adaptive array deployment in the near future.

Phased array antenna systems employ a plurality of individual antennas or subarrays of antennas that are separately excited to cumulatively produce an electromagnetic wave that is highly directional. The radiated energy from each of the individual antenna elements or subarrays is of a different phase so that an equiphase beam front, or the cumulative wave front of electromagnetic energy radiated from all of the antenna elements in the array, travels in a selected direction. The difference in phase or timing between the antenna's activating signals determines the direction in which the cumulative wave front from all of the individual antenna elements is transmitted. Analysis of the phases of return beams of electromagnetic energy detected by the individual antennas in the array similarly allows determination of the direction from which a return beam arrives.

Beamforming, which is the adjustment of the relative phase of the actuating signals for the individual antennas, can be accomplished by electronically shifting the phases of the actuating signals. Beamforming can also be performed by introducing a time delay in the different actuating signals to sequentially excite the antenna elements which generate the desired direction of beam transmission from the antenna. However, phase-based electronically controlled phased array systems are relatively large, heavy, complex, and expensive. These electronic systems require a large number of microwave components (such as phase shifters, power splitters, and waveguides) to form the antenna control system. This arrangement results in a system that is relatively lossy, electromagnetically sensitive, hardware-intensive, and has a narrow tunable bandwidth.

Optical control systems can be advantageously used to create selected time delays in actuating signals for phased array systems. Such optically generated time delays are not frequency dependent and thus can be readily applied to broadband phased array antenna systems. For example, optical signals can be processed to establish the selected time delays between individual signals, thus causing the desired sequential actuation of the transmitting antenna elements. The optical signals can then be converted to electrical signals, such as by a photodiode array. Different types of optical architectures have been proposed to process optical signals that generate selected delays. Examples of these architectures are fiber optic segments of different lengths for routing the optical signals; deformable mirrors for physically changing the distance light travels along a reflected path before being converted to an electrical signal; and free space propagation based delay lines, which typically incorporates polarizing beam splitters and prisms.

U.S. Pat. No. 5,117,239 and U.S. Pat. No. 5,187,487 describe a system that creates a cluster of optical beams coupled into individually-controlled pixels of a spatial light modulator (SLM). The SLM provides selectable phase shifts to each of the beams. Some optical delay devices, such as U.S. Pat. No. 5,461,687, utilize the refractive properties of different wavelengths of light to provide individually controlled phase shifting of wavelength-multiplexed light. Although optical processing offers great improvements over radio frequency (RF) and digital array processing, current optical processing approaches merely replace microwave components with optical components without reducing the complexity of the system. For example, an optical system having a number N of array elements requires N phase-shifters and N associated phase-shifter control systems. Some devices, such as Rotman lenses, are designed to reduce or eliminate the need for adjustable phase shifters. However they increase system complexity and size by introducing complex elements and systems as well as by introducing additional detectors.

Several optical systems that exhibit unusual properties have been built, but their application to phased array signal processing had been overlooked. In the Optics Letters article "Broadband Continuous Wave Laser," applicant described a laser design that utilizes a traveling-wave frequency-shifted feedback cavity (FSFC) to circulate light through a gain medium. Light circulating through the FSFC is frequency shifted by an acousto-optic modulator (AOM) upon each pass through the cavity. A unique characteristic of this cavity is that, unlike a Fabry-Perot cavity, it does not selectively attenuate signal frequencies. In the thesis "A New Method for Generating Short Optical Pulses," applicant describes how an optical signal propagating through a FSFC is spread in frequency to generate broadband lasing, where the amount of frequency spreading is proportional to the number of times that light circulates through the cavity. In the Applied Physics Letters article "Optical Pulse Generation with a Frequency Shifted Feedback Laser," applicant describes an interference condition in which the broadband output of the laser produces short optical pulses, which have a frequency that is related to the RF shift frequency of the AOM. The time-domain characteristics of these optical pulses are similar to RF pulse-radio emissions.

Although pulse-radio systems are well known in the art, they are not well suited for commercial applications. Pulse-radio is a time-domain system that produces broadband radiation as a natural artifact resulting from the generation of short-duration pulses. Broad bandwidth, hence large effective processing gain, makes pulse radio ideal for covert communications. However, its broad bandwidth, particularly the portion occupying the low-frequency ranges of the RF spectrum, makes proposed commercial pulse-radio systems unlikely candidates for FCC approval. The short pulse width of pulse-radio signals makes Rake reception very difficult. A Rake receiver used in a pulse-radio system would require an extraordinary number of taps, on the order of the pulse repetition rate divided by the pulse width.

SUMMARY OF THE INVENTION

Therefore it is the principle object of the present invention to provide a novel and improved method and apparatus for the generation of excitation signals across an antenna array to control a directional beam pattern. The foregoing is accomplished by repeatedly circulating or otherwise reflecting within a cavity a continuous wave through a piece of equipment adapted to bring about a frequency shift upon each pass through the cavity. Consequently, each of a plurality of waves inside the cavity is provided with an incremental value of delay and an incremental frequency shift that is proportional to the amount of delay. A plurality of transmit signals are coupled out of the cavity and are wavelength demultiplexed to produce a plurality of separated transmit signals representing different incremental delays. Each of the separated signals is coupled to an array element and down-converted for transmission to produce the array's beam pattern. Similarly, an incident RF receive signal is received by each antenna array element and converted into one of a plurality of optical receive signals having an incremental frequency associated with the array element. The optical receive signals are coupled into the cavity and thus delayed and frequency shifted in the manner previously described. A portion of the delayed and frequency-shifted optical receive signals are coupled out of the cavity and separated by frequency in a receiver. Each frequency represents an incremental time sample of the signal received from a direction determined by the value of the incremental delay provided by the cavity.

It is, therefore, a second objective to provide a Rake-type receiver that is capable of sampling signals in time without the use of delay taps.

Another objective of the invention herein disclosed and claimed is to produce a train of ultra-short RF pulses from a rheterodyned frequency-shifted feedback cavity, thus providing a novel spread-spectrum communications format:

Accordingly, another object is to provide pulsed output resulting from interference between a plurality of carrier waves, the carrier waves being chosen with respect to frequency band constraints.

Still another objective is to provide a spread-spectrum format that is easily adapted to adaptive array processing in a multiple-access communications system.

Another object of the invention is to control the direction of an antenna beam pattern of an array comprising a large number of antenna elements by controlling the incremental delay of excitation of the array elements through the use of a single delay device.

Still another objective is that of providing a broadband antenna array pattern having lowered sidelobe magnitudes and no secondary main-lobe structures.

An additional objective is that of shaping time-domain pulses by applying a tapered window function to carrier-signal amplitudes in the frequency domain.

Further objects of the invention herein disclosed and claimed are to provide narrow pulse widths and lower time-domain sidelobes by utilizing non-redundant spacing of interfering carrier frequencies, to shape and control fringes in time-domain pulses via frequency domain adjustments of carrier signals, and to smooth out comb structures in the frequency domain by dithering the frequency of each carrier signal.

DESCRIPTION OF THE PREFERRED EMBODIMENTS

The standard method for sustaining laser oscillation uses feedback from a Fabry-Perot cavity. The multiple reflections within the cavity lead to destructive interference for all frequencies of light except those discreet frequencies that correspond to the standing waves of the cavity. This is demonstrated by frequency discrimination that occurs within an etalon. The intensity of light that is transmitted through an etalon is sharply peaked at the resonance of the cavity. Non-resonant waves destructively interfere within the cavity, thus canceling almost entirely. Therefore, a Fabry-Perot cavity used as a feedback cavity in a laser causes the laser output power to be distributed in a narrow spectral region that corresponds to the modes of the cavity.

A traveling-wave FSFC laser, as described in the cited papers co-authored by applicant, does not selectively attenuate frequencies. Rather, this laser is characterized by its unusually broad spectral output, which has no mode structure. A frequency-shifting device, such as an AOM, is used inside the cavity to incrementally shift the frequency of circulating light upon each pass through the cavity. A gain medium inside the cavity maintains a constant intensity of the light over a broad spectral range, and a system of mirrors is used to circulate light through the AOM and the gain medium. Spectral analysis of the laser output indicated a continuous distribution of energy, which has a full-width half-maximum of 8 Angstroms centered at 5900 Angstroms.

Figure 1:
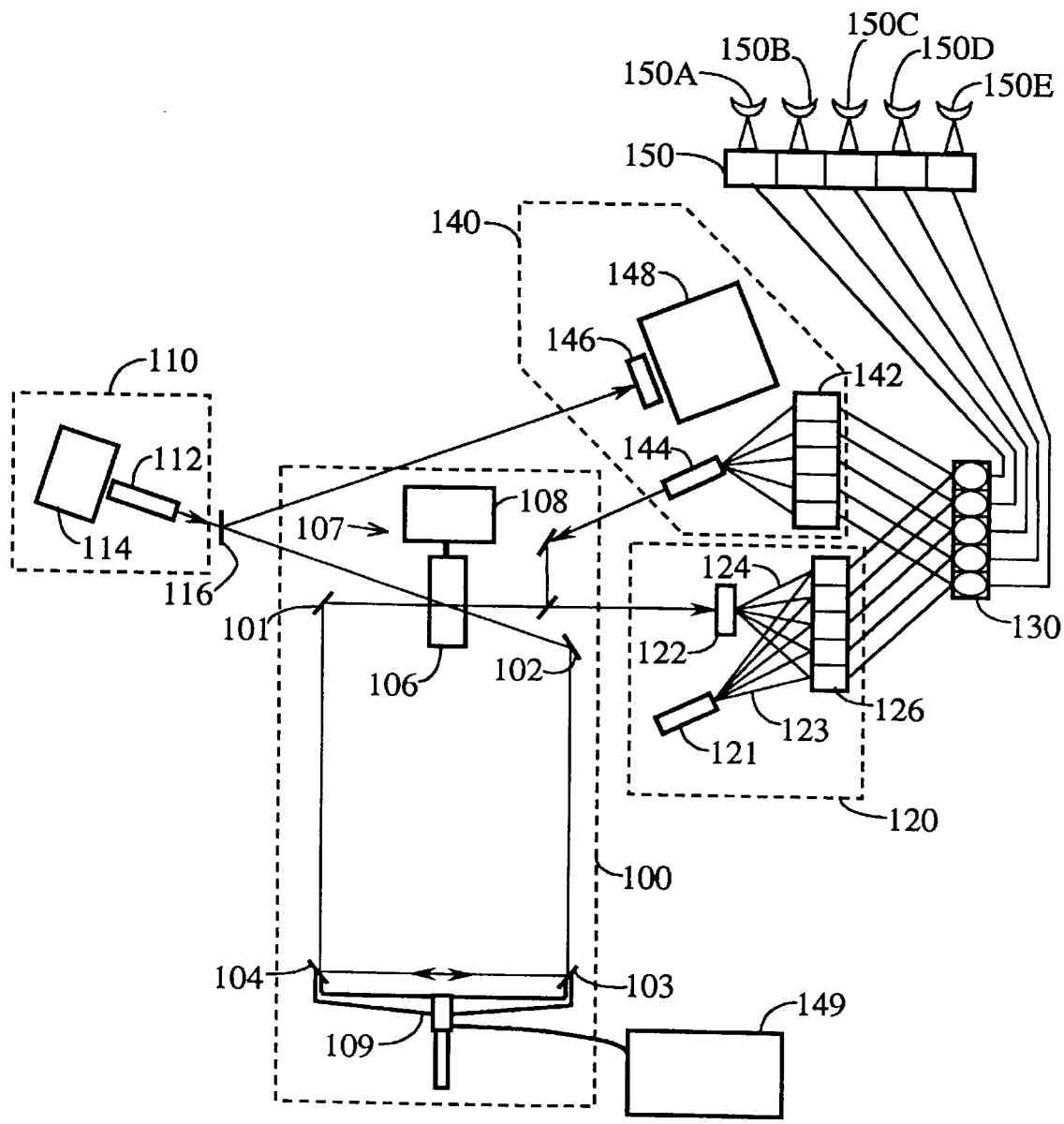
FIG. 1 is a schematic of an array processor including a traveling-wave cavity that contains a frequency-shifting device through which optical signals are circulated.

An optical processor for an antenna array 150 shown in FIG. 1 derives its operational characteristics from a traveling-wave FSFC 100. The processor includes an injection source 110 for generating an optical transmit seed signal. The injection source 110 is optically coupled to the FSFC 100. The injection source 110 may use any type of light-emitting source to generate the transmit seed signal. In this embodiment, the injection source includes a laser source 112 and a laser source controller 114. The FSFC 100 includes a frequency-shifting device (such as an AOM 107) and a cavity-length adjustment device (such as a translation stage 109), which is controlled by a scan controller 149. The FSFC 100 may also include a gain medium (not shown). An optical-to-RF signal converter such as a heterodyne detection device 120, is optically coupled to the FSFC 100. The heterodyne detection device 120 includes an output-beam wavelength demultiplexer (such as a diffraction grating 122), a fiber optic array link 124, an optical reference source 121, a reference beam fiber optic link 123, and a photodiode array 126 comprised of a plurality of photodiodes. A transmit/receive coupler array 130 connects the antenna array 150 to the photodiode array 126 and to an RF-to-optical signal converter 142 inside an optical receiver network 140. The RF-to-optical signal converter 142 is coupled to the FSFC 100 via an optical beam combiner 144. The optical receiver network 140 also includes a receive-beam wavelength demultiplexer, such as receiver diffraction grating 146, coupled to the FSFC 100. The receiver diffraction grating 146 is also optically coupled to a receiver 148.

The antenna array 150 shown in FIG. 1 includes five array elements 150A, 150B, 150C, 150D, and 150E. However, the present invention is capable of controlling a much larger number of array elements. Broadband characteristics of the FSFC 100 make it an ideal device for providing incremental delays to a very large number of elements. For example, a FSFC 100 having the same broadband characteristics as the frequency-shifted feedback laser described in the aforementioned papers would be capable of providing incremental delays to more than 6000 antenna array elements.

The laser source 112 may be any type of laser-beam generator that can provide beam intensities sufficient for operation of the processor as described in this application and may include more than one laser. The laser source is preferably a semiconductor laser. The laser source 112 emits an optical transmit seed signal that is coupled into the FSFC 100. For beam-forming applications, it is preferable that the transmit seed signal be a narrow-band signal. It is possible and in some cases preferable for the laser source 112 to emit multiple optical signals, each having a different frequency. Each frequency of the transmit seed signal emitted by the laser source 112 and coupled into the FSFC 100 is ultimately used to control at least one RF beam pattern radiated by the antenna array 150. The multiple optical signals may control multiple beam patterns and/or multiple sub-arrays of the antenna array 150. However, the embodiment of the array processor shown in FIG. 1 is used to describe how the processor functions with respect to a single frequency of light input into the FSFC 100. In this case, the laser source 112 is modulated by the laser-source controller 114 at a data rate corresponding to an information signal to be transmitted. Various types of modulation may be used to produce a modulated transmit seed signal, such as AM, FM, PAM, PSK, FH, and time-offset modulation.

The FSFC 100 shown in FIG. 1 includes a traveling-wave cavity comprising a plurality of mirrors 101, 102, 103, and 104 for circulating optical traveling waves around a closed loop. Equivalently, any type of waveguide that utilizes optical reflection or refraction may be used to circulate light. A travelling wave cavity may have a number of reflecting surfaces, each of which must be properly aligned for proper operation. Thus it is preferable to use a cavity design that minimizes the difficulty in achieving proper alignment. In this case, we assume the FSFC 100 has a round-trip length L that is independent of the frequency of the circulating optical waves. This causes the transmit seed signal in the FSFC 100 to be incrementally delayed relative to the number of round trips made by the transmit seed signal, thus providing a plurality of delayed transmit signals. The first five delayed transmit signals are $S_{Tn}$ (n=1, . . . ,5): $S_{T1}$, $S_{T2}$, $S_{T3}$, $S_{T4}$, and $S_{T5}$. Each of the delayed transmit signals $S_{Tn}$ incurs an incremental delay $t_{dn}$=nL/C as it circulates through the FSFC 100. C is the speed of light in the FSFC 100 and n is an index representing the number of times that the transmit seed signal has circulated through the FSFC 100. The FSFC 100 is unusual in that, unlike a Fabry-Perot cavity, it does not produce modes. Thus, the length of the FSFC 100 does not limit the frequency of the light circulating inside the cavity 100.

The FSFC 100 focuses light into the aperture of the AOM 107. Although the AOM 107 shown is classified as a "bulk" optic frequency shifter, other types of frequency shifters (such as fiber optic frequency shifters) may be used. The AOM 107 comprises a transducer 106 that is electrically coupled to an RF source 108. Light incident on the AOM 107 is split into two clusters of beams, one of which is undiffracted and one of which is diffracted and Doppler-shifted by an amount corresponding to a shift-frequency $f_s$ equal to that of an RF signal generated by the RF source 108. The undiffracted and diffracted beams emerging from the AOM 107 are spatially separate, the angular separation between the two beams being equal to twice the Bragg angle. In this case, the AOM 107 functions as an input coupler to optically couple the transmit seed signal into the FSFC 100. However, other methods of coupling the transmit seed signal into the FSFC 100 may be used without departing from the scope of the invention.

The transmit seed signal coupled into the FSFC 100 from the laser source 112 circulates through the FSFC 100 in a clockwise direction. As optical signals circulate through the FSFC 100, they are frequency shifted by a fixed amount upon each pass through the AOM 107. The delayed transmit signals $S_{Tn}$ are frequency shifted by the shift frequency $f_s$ upon each pass through the AOM 107 that results in the signal $S_{Tn}$ being diffracted. Therefore, the delayed transmit signals $S_{Tn}$ are also referred to as frequency-shifted transmit signals. The number of times each of the delayed transmit signals $S_{Tn}$ has circulated through the FSFC 100, hence its delay, is implicitly known from its wavelength. Each of the delayed transmit signals $S_{Tn}$ has a frequency equal to $f_o+(n-1)f_s$, where $f_o$ is the frequency of the transmit seed signal. The process of adjusting the effective length L of the FSFC 100 adjusts the incremental delay without significantly affecting the frequency or the amplitude of the optical signals circulating inside the FSFC 100. Thus, length adjustment of the FSFC 100 results in scanning the antenna array's 150 beam pattern.

The translation stage 109 is attached to mirrors 103 and 104 of the FSFC 100 and may be used to adjust the incremental delays provided by the FSFC 100 to the delayed transmit signal beams, which ultimately control excitation of the elements of the array 150. Other types of cavity-length adjustment devices may be used. For example, an intracavity delay device, such as a rotating quartz block (not shown) may be used to scan the beam pattern of the antenna array 150. Frequency-selective delay may be applied to signals inside the FSFC 100 or following the output of the FSFC 100 in order to provide non-incremental delay that enhances focusing capabilities of the antenna array 150.

"A New Method for Generating Short Optical Pulses" explains that the bandwidth of the frequency-shifted feedback laser is limited due to geometric constraints of the FSFC 100. The AOM 107 diffracts light an amount that depends on the wavelength of the light causing light that is not inside the FSFC's 100 bandwidth to transit out of the cavity 100. Either or both the placement and the selection of mirror parameters (size and focal length) for mirrors 101, 102, 103, and 104 in the FSFC 100 can be used to increase the bandwidth of the FSFC 100. This also indicates that there are certain spatial relationships associated with the wavelength of the circulating light within the FSFC 100 that may be used to provide variable delays to the signal beams. These spatial relationships may also be used to provide amplitude control to the distribution of transmit signals over the antenna array 150. For example, masks (not shown) and spatially selective attenuation or gain devices (not shown) may be used to adjust the amplitude distribution of signals circulating inside the FSFC 100 for the purpose of beam shaping.

Losses in the FSFC 100 result in a reduction in the intensity of optical signals as they circulate through the cavity 100. Therefore it may be advantageous to provide a gain medium (not shown) inside the FSFC 100. The gain medium (not shown) may be excited optically, electrically, or chemically to stimulate its initial emissions. Furthermore, the gain medium may be the coupling means through which the transmit seed signal from the injection source 110 is coupled into the cavity 100. One possible embodiment, although not described in detail in this discussion, involves the excitation of the gain medium being directly modulated, such as by the laser source controller 114, for generating a modulated transmit signal. A first criteria of the gain medium is that the initial stimulated emissions are narrow band and single frequency. Accordingly, it is advantageous that the gain medium (not shown) comprises a Fabry-Perot cavity having a harmonic response that generates modes associated with the shift frequency $f_s$ generated by the AOM 107. A second criteria for the gain medium (not shown) is that it produce narrow-band single-frequency stimulated emissions in response to narrow-band single-frequency delayed transmit signals $S_{Tn}$ in the FSFC 100.

In the embodiment shown in FIG. 1, the AOM 107 acts as an output coupler for coupling a portion of the delayed transmit signals $S_{Tn}$ circulating in the cavity 100 to the heterodyne detection device 120. Other types of output couplers may be used, such as partially transmitting mirrors (not shown) and beam-splitters (not shown). An output coupler should be chosen based on the effect that it has on the intensity of light circulating inside the cavity 100. In this case, the AOM 107 also acts as an input coupler for coupling light from the laser source 112 into the FSFC 100. The beam from the laser source 112 is focused on the AOM 107 at the Bragg angle so that undiffracted light is coupled into the FSFC 100. The diffracted light represents an insertion loss. Another option involves coupling the light from the laser source 112 through the AOM 107 at an angle that couples diffracted light into the FSFC 100. Thus, the undiffracted light would represent an insertion loss. The AOM 107 may be a multichannel AOM (not shown) used for more than one transmit or receive signal. The multi-channel AOM (not shown) may have parallel inputs that employ multiple acousto-optic modulators on a common acousto-optic medium, and may have multiple independent channels.

The AOM 107 and the FSFC 100 may also be used to process a transmit/receive pair of signals for full-duplex operation. This is illustrated in FIG. 1 in which a wavelength-multiplexed receive signal from the optical receiver network 140 is also coupled through the AOM 107 into the FSFC 100. Once again, the AOM 107 functions as an input coupler. Other types of input couplers may be used. The choice of input coupler should depend on the input coupler's effect on the intensity of light circulating in the FSFC 100 as well as the insertion loss associated with coupling light into the FSFC 100.

The process of wavelength demultiplexing the frequency-shifted transmit signals $S_{Tn}$ that are output from the FSFC 100 achieves separation of these signals relative to their delay. The heterodyne detection device 120 receives a portion of the frequency-shifted transmit signals $S_{Tn}$ coupled out of the FSFC 100. The coupled-out portion of frequency-shifted transmit signals $S_{Tn}$ are spatially demultiplexed by the diffraction grating 122, which separates these signals according to their wavelength into a plurality of wavelength-demultiplexed transmission signals $S_{DTn}$. Thus the wavelength-demultiplexed signals $S_{DTn}$ are effectively separated with respect to index n. Although the diffraction grating 122 is shown, other types of demultiplexers, such as photo-refractive elements (not shown), may be used to demultiplex signals $S_{DTn}$.

Each of the demultiplexed transmission signals $S_{DTn}$ is coupled into an optical fiber that is part of the fiber optic array link 124. Each fiber in the fiber optic array link 124 is preferably of an incremental or uniform length to provide incremental or uniform delay to each of the demultiplexed signals $S_{DTn}$ and is terminated in a respective photodiode in the photodiode array 126.

The optical reference source 121 generates a plurality of optical reference signals $S_{Refn}$. Each of the signals $S_{Refn}$ is coupled to a respective photodiode in the photodiode array 126 via the reference beam fiber optic array link 123. The optical reference signals $S_{Refn}$ are distinguished from each other by the index n. In this case, the reference signals $S_{Refn}$ generated by the optical reference source 121 have incremental frequencies $f_{Refn} = f_c + nf_s$ relative to index n and have an incremental value substantially equal to the AOM's 107 shift frequency $f_s$. A constant center frequency $f_c$ is a component of each of the reference frequencies $f_{Refn}$. The reference source signals $S_{Refn}$ are combined with the demultiplexed transmission signals $S_{DTn}$ with respect to the index n at the photodiode array 126. Each photodiode of the photodiode array 126 detects the interference between one of the optical reference signals $S_{Refn}$ and one of the demultiplexed transmission signals $S_{DTn}$. Each of the photodiodes generates a corresponding radiative transmit signal $S_{TXn}$, which in this case is an RF transmit signal or an intermediate signal. The radiative transmit signal $S_{TXn}$ has a differential frequency $f_d = |f_c - f_o|$. The value of the differential frequency $f_d$ may change with respect to changes in the signal frequency $f_o$. In this case, the reference source 121 may comprise an array of lasers (not shown) or a Fabry-Perot laser (not shown) that outputs a plurality of modes corresponding to the frequency shifts $f_g$ generated by the AOM 107.

The RF transmit signals $S_{TXn}$ are coupled to the antenna array 150 by the transmit/receive coupler array 130, which operates in either or both a transmit mode and a receive mode. In the transmit mode, the transmit/receive coupler array 130 couples the RF transmit signals $S_{TXn}$ to the antenna array 150. In the receive mode, the transmit/receive coupler array 130 couples RF receive signals $S_{RXn}$ received from the antenna array 150 to the optical receiver network 140. Each of the RF transmit signals $S_{TXn}$ is amplified by one of a plurality of amplifiers (not shown) in the antenna array 150 to generate an amplified RF transmit signal component. Each RF transmit signal component is radiated by one of the plurality of array elements 150A to 150E. The component radiated by each array element has an incremental delay defined by the index n, the round-trip length L of the FSFC 100, and the relative path length of the delayed transmit signal coupled from the FSFC 100 to the antenna element of the array 150. The direction of the radiated RF transmit signal is determined by the incremental delays at the antenna elements.

A plurality of RF signals $S_{RXn}$ are generated by the array elements 150A to 150E, which are responsive to incident RF radiation. Each of the RF signals $S_{RXn}$ corresponds to one of the array elements 150A to 150E as represented by the index n. The RF signals $S_{RXn}$ are routed through the transmit/receive coupler array 130 to the optical receiver network 140. The RF-to-optical converter 142 converts each of the received RF signals $S_{RXn}$ into an optical receive signal $S_{ROn}$. Each optical receive signal $S_{ROn}$ has a unique base frequency that corresponds to the particular antenna element that is associated with that signal. The amplitude, phase, and frequency of the optical receive signals $S_{ROn}$ are responsive to modulations of received RF carrier frequencies.

In the case where the antenna array 150 is a phased array (the elements 150A to 150E are separated by a uniform distance), the difference in frequency between the optical receive signals $S_{ROn}$ corresponds to an integer multiple, such as the index n, of the AOM 107 shift frequency $f_o$. In this particular example, the frequency $f_n$ of each optical receive signal $S_{ROn}$ is the sum of a base frequency $f_o$ and the integer multiple (n−1) of the shift frequency $f_s$. The base frequency of the optical receive signal $S_{RO1}$ corresponding to the RF signal received by antenna element 150A has a value: $f_1 = f_o$. The optical receive signal $S_{RO2}$ corresponding to the RF signal received by antenna element 150B has a base frequency: $f_2 = f_o + f_s$. The optical receive signal $S_{RO3}$ corresponding to the RF signal received by antenna element 150C has a base frequency: $f_3 = f_o + 2f_s$. The optical receive signal $S_{RO4}$ corresponding to the RF signal received by antenna element 150D has a base frequency: $f_4 = f_o + 3f_s$. The optical receive signal $S_{RO5}$ corresponding to the RF signal received by antenna element 150E has a base frequency: $f_5 = f_o + 4f_s$.

Each of the optical receive signals $S_{ROn}$ is combined in the optical beam combiner 144 to produce the combined receive beam. The combined receive beam is the sum over all n of the optical receive signals $S_{Ron}$. The combined receive beam is coupled into the FSFC 100 through the AOM 107, which diffracts a portion of the combined receive beam into the FSFC 100. As previously discussed, other types of optical couplers could be used.

The angle of incidence of the combined receive beam at the AOM 107 allows a diffracted portion of the combined receive beam to be coupled into the FSFC 100. The diffracted combined receive beam circulates the FSFC 100 in a counter-clockwise direction, and it is frequency shifted to create a plurality of frequency-shifted receive signals $S_{Rmn}$ as it is diffracted through the AOM 107. An index m indicates the number of round trips in the FSFC 100 made by each signal $S_{Rmn}$. The number of frequency shifts experienced by each signal $S_{Rmn}$ is one less than index m. The index n indicates that the signals $S_{Rmn}$ have a plurality of discreet frequencies related to the number n of discreet frequencies in the optical receive signal $S_{Ron}$. An undiffracted portion of each frequency-shifted receive signal $S_{Rmn}$ is coupled out of the cavity 100 by the AOM 107 and separated from light emitted by the laser assembly 110 by a beam-splitter 116. Thus, a plurality of output receive signals $S'_{Rmn}$ having the same frequency profile as signals $S_{Rmn}$ is coupled into the optical receiver network 140. The receiver diffraction grating 146 separates the output receive signals $S'_{Rmn}$ into a plurality of component receive signals $S_{Cj}$. Each of the component receive signals $S_{Cj}$ has a different frequency represented by an index j where j=(m−1)+(n−1). One or more of the component receive signals $S_{Cj}$ are coupled into the receiver 148.

The output receive signal has component frequencies $f_{Cj}$ starting at $f_{C0}=f_o$ and increasing in incremental steps j of the shift frequency $f_s$: $f_{Cj}=f_o+jf_s$. For example, component receive signal $S_{C4}$ has a frequency $f_{C4}=f_o+4f_s$, which corresponds to signals $S'_{R51}$, $S'_{R42}$, $S'_{R33}$, $S'_{R24}$, and $S'_{R15}$. Signal $S'_{R15}$, represents the optical receive signal $S_{RO1}$, which corresponds to the excitation of antenna element 150A. The signal $S_{RO1}$ had a base frequency of $f_o$ before being circulated through the FSFC 100 five times and consequently being frequency shifted by an amount $4f_s$. Likewise, signal $S'_{R42}$ represents optical receive signal $S_{RO2}$ from antenna element 150B after it has circulated through the FSFC 100 four times. Signal $S'_{R33}$ is a portion of signal $S_{RO3}$ from antenna element 150C that has circulated through the FSFC 100 three times. Signal $S'_{R24}$ represents the signal $S_{RO2}$ from antenna element 150D that has circulated through the FSFC 100 twice. Signal $S'_{R15}$ indicates part of the signal $S_{RO1}$ from antenna element 150E that was not diffracted by the AOM 107 on its single round trip through the FSFC 100.

Each of the component receive signals $S_{Cj}$ represents an incremental delay between each of the antenna elements 150A to 150E, where j indicates a different uniform delay that is distributed evenly across the antenna array 150. This enables the receiver 148 to function as a Rake receiver, thereby sampling in incrementally-spaced time intervals by tuning to a selection of incrementally-spaced (in j) component receive signal frequencies $f_{Cj}$. Each of the component receive signals $S_{Cj}$, when sampled simultaneously, is a sample of a specific incrementally-spaced time interval. Unlike a conventional Rake receiver, which uses a clock to time the intervals in which samples are taken, the receiver 148 can use a plurality of frequency filters (not shown) to sample in the time domain.

The amount of incremental delay between the antenna elements 150A to 150E determines the angular orientation of the array's 150 beam pattern. Adjusting the length of the FSFC 100 changes the effective viewing direction of the antenna array 150. Thus, the process of adjusting the cavity length to scan the antenna array can be controlled by a scan controller 149, which may be coupled to the receiver 148. In this configuration, the scan controller 149 measures the receiver's 148 output and uses that measurement to control the scanning process in order to optimize the receiver's 148 reception of a particular received signal. Thus, direction-of-arrival determination of received signals can be handled efficiently and with minimum computational complexity compared to conventional scanning techniques.

Adjusting the FSFC 100 length changes the relative delay between the component receive signals $S_{Cj}$. If the receiver 148 is operated in a Rake receiver mode (more than one signal $S_{Cj}$ being observed), the time between samples can be adjusted by adjusting the FSFC 100 length.

The reference source 121 may include a narrow-band single-frequency optical signal source. This causes the radiative transmit signal $S_{TXn}$ to be incremental in frequency with respect to index n and the shift frequency $f_s$. This type of radiative transmit signal generates time-domain pulses by utilizing carrier interference multiple access (CIMA), a type of spread spectrum that makes use of interference between multiple carrier signals to create an information signal. This particular type of CIMA is similar to mode locking in that mode-like carrier signals having incremental frequencies are phase locked to produce constructive interference within a given time interval, resulting in sinc-type pulses. Although the system in FIG. 1 is shown as a preferred embodiment of the invention for generating CIMA signals, other types of RF systems as well as optical systems may be used to generate CIMA signals.

Mode locking is a technique wherein a plurality of frequency-shifted optical signals are summed according to a particular phase relationship in order to produce short optical pulses. This is typically performed using a Fabry-Perot laser whose modes are the frequency-shifted signals, and the boundary conditions of the standing wave cavity provide the phase relationship between the modes needed to generate pulses. The pulses occur at a repetition rate equal to the shift frequency $f_s$. The pulse width is inversely proportional to the number of modes N. The pulse height (peak power) is the product of the average power of the modes and the number of modes N. In this example, there are N equal-amplitude modes. Thus the general expression for the electric field at a particular point in space:

$$e(t) = \sum_{-(N-1)/2}^{(Ni1)/2} E_n \exp\left[i(\omega_o + n\omega_s)t + \phi(\tau)\right]$$

which can be written as:

$$e(t) = E_o \exp(i\omega_o t)\left[\frac{\sin(N\omega_s t/2)}{\sin(\omega_s t/2)}\right]$$

where $E_o$ is the electric strength of each constant-amplitude mode, t is time, $\omega_o$ is the center frequency, and $\omega_s$ is the angular shift frequency: $\omega_s=2\pi f_s=2\pi/\tau$. $\tau$ is the period of the pulses.

The equations for the electric field strength e(t) describe a mode-locked laser output. The term "mode locking," as referred to lasers refers to the process by which resonant longitudinal modes of a laser cavity are synchronized in phase, so as to produce a train of electromagnetis pulses in the laser output. However, this type of pulsed output can also be generated by the antenna array 150 in FIG. 1. A novel aspect of the optical processor shown in FIG. 1 is that it generates a mode-lock-type spread-spectrum output comprising multiple RF carrier frequencies that interfere to generate a baseband information signal. The sinc-type pulses produced by this invention are similar to the time-domain output of pulse radio signals. However, the novel benefits of the present invention are defined by the frequency domain characteristics of CIMA pulses. For example, a pulse-radio output that occupies 2 GHz of frequency spectrum occupies the spectrum from 0 to 2 GHz. However, it is possible to select a group of signals in any frequency band to produce CIMA signals. The interference relationship between the group of signals determines the time-domain characteristics of the pulse. Thus, a CIMA output that occupies 2 GHz of bandwidth may comprise signals in the frequency spectrum between 28 and 30 GHz.

Figure 2:
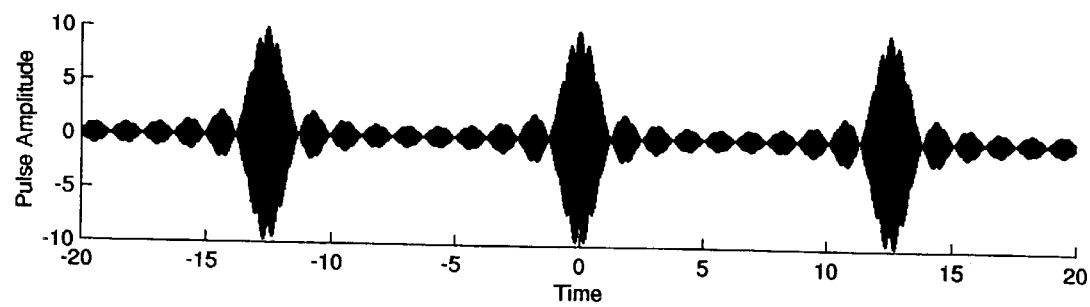
FIG. 2 is a plot of time-domain pulses resulting from constructive interference between 10 incrementally spaced-in-frequency carrier signals.
Figure 3:
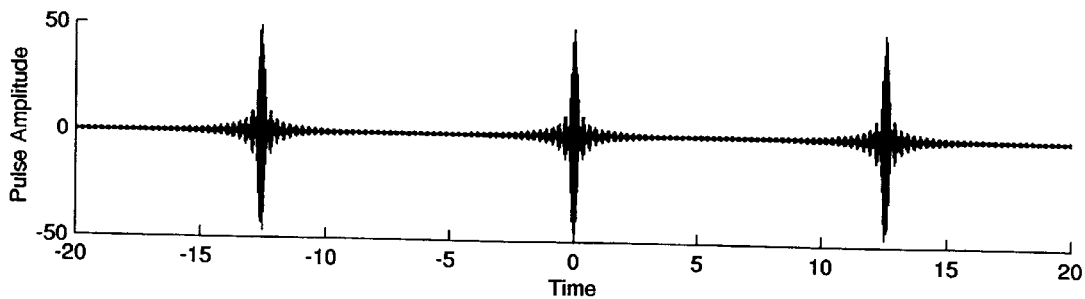
FIG. 3 is a plot of time-domain pulses resulting from constructive interference between 50 incrementally spaced-in-frequency carrier signals.

A plot of a mode-locked output generated by the sum of ten equal-amplitude modes is shown in FIG. 2, and a plot of a mode-locked output produced by the interference between 50 equal-amplitude modes is illustrated in FIG. 3. Each mode has a frequency that equals the sum of a base frequency $f_b$ and an integer multiple i (i=1, . . . ,N) of an incremental separation frequency $f_i$. In the case where the FSFC 100 is used to generate the modes, the base frequency $f_b$ may correspond to the optical transmit seed signal's frequency, and the separation frequency $f_i$ may correspond to the shift frequency $f_s$ of the AOM 107. In this case, the base and separation frequencies $f_b$ and $f_i$ have relative values of 1000 and 0.5, respectively, and have units of inverse time scaled by an arbitrary multiplier. The ten modes that comprise the pulses shown in FIG. 2 range in frequency from 1000.5 to 1005. The frequency spectrum occupied by the pulses shown in FIG. 3 includes 50 discreet frequencies in the range of 1000.5 to 1025. The pulses are essentially envelopes that enclose a signal that has a frequency that is approximately the value of $f_b$. The significance of this example is that it shows that modes can be selected from limited frequency spectrums to produce short time-domain pulses for CIMA.

FIG. 2 and FIG. 3 shows that as the number of modes increases, the pulse height increases and the pulse width decreases. The pulses represent a constructive interference condition between the modes, which occurs in a narrow (t=1/τ) time domain, whereas the sidelobes indicate a quasi-orthogonal condition between the modes that exists throughout the rest of the time domain. In this quasi-orthogonal region, the amplitudes and phases of the individual modes are such that they combine destructively and thus substantially cancel.

Figure 4:
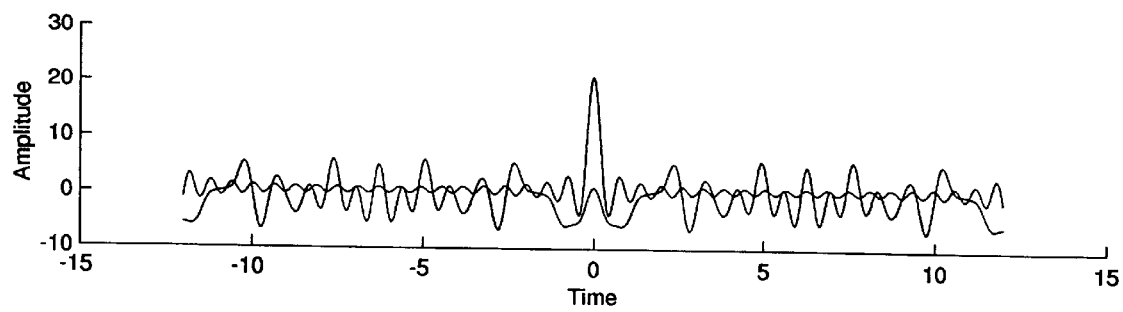
FIG. 4 is a comparison plot of a time-domain pulse and a signal resulting from a sum of carrier signals whose phases have been adjusted by a maximal direct sequence code.

Because of the quasi-orthogonal nature of the modes, the application of a pseudo-random code to control the relative phases of the modes, as is done in OFDM-CDMA, has some inherent problems if it is applied to mode-locked signals. This is because the quasi-orthogonal nature of the modes, which is utilized to effect multiplexing, has a tendency to be disrupted by the imposition of another coding sequence. FIG. 4 illustrates a comparison between a mode-locked signal M1 and a summed OFDM-CDMA signal O1. The mode-locked signal M1 comprises the sum of 21 modes, The OFDM-CDMA signal O1 comprises the sum of the same 21 modes in which the phase of each mode has been bi-phase shift key (BPSK) phase shifted according to a maximal sequence of 21-chip length. As expected, the OFDM-CDMA signal O1 at time=0 is much smaller than the mode-locked pulse of signal M1. At time=0, the mode-locked signal M1 is the sum of the maximum amplitudes of each mode. Because the maximum amplitude is the same for each mode, the applied maximal sequence reduces the time=0 amplitude of O1 to one, an amount corresponding to the difference between the number of 0 degree and 180 degree phase shifts dictated by the maximal sequence. Thus, modes having a tapered amplitude most likely produce an OFDM-CDMA signal O1 having poorer pulse-reduction at time=0. More importantly, the OFDM-CDMA signal O1 exhibits spikes at other time intervals, which add significant levels of interference to users tuned to those time intervals. These spikes represent where the quasi-orthogonality of the modes, represented by the low-amplitude profile of the mode-locked signal M1, has been compromised by the maximal coding sequence.

Figure 5:
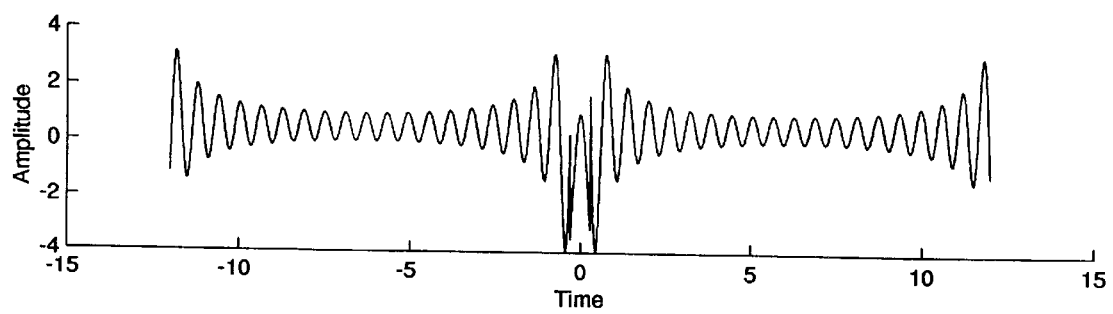
FIG. 5 is a plot of a time-domain signal resulting from a sum of carrier signals whose phases have been adjusted by a maximal direct sequence code within a narrow time interval centered around the amplitude of the pulse shown in FIG. 4.

One solution for reducing the deterioration of the quasi-orthogonal nature of the modes is to select a coding sequence that is applied within discreet time intervals. Preferably, these time intervals are about the size of the pulse-width of the mode-locked signal M1 or smaller. Because an orthogonality condition already exists between the modes, it is a preferred embodiment of the invention to provide direct-sequence coding to the modes only during a discreet time interval that contains the pulse of the mode-locked signal. FIG. 5 shows a mode-locked signal M2 that has a 21-chip maximal code applied to it within a time interval that is approximately the pulse width of M2 and is centered at time=0. It is recommended that the direct-sequence code be chosen to compensate for any amplitude tapering of the modes.

The expression for the electric field e(t) shown in FIG. 2 and FIG. 3 is a window-response function in the time domain. The electric field e(t) is simply the discreet-time Fourier transform (DTFT) of a rectangular window sequence w(n) in the frequency domain. The window sequence w(n) describes the amplitude distribution of the n=1 to N modes, which so far have been considered to be equal amplitude. As N increases, the height of the first sidelobe approaches a constant value of −13.56 dB of the main-lobe amplitude. The sidelobes contain the harmonic power of the excitation sequence w(n), thus reducing the rise and fall rates of the sequence w(n) with respect to n reduces the sidelobe level.

The sidelobe level can be reduced by using a window sequence that tapers smoothly toward zero at the ends of the sequence. In antenna array processing, a spatial domain technique known as "array tapering" is used to reduce sidelobes of an antenna array's beam pattern. In DS-CDMA, a technique called minimum shift keying is used to shape chips in the time domain in order to reduce harmonic interference in the frequency domain. Consequently, an object of this invention is to taper the amplitude profile of modes that have discreet frequencies in order to reduce sidelobes of the mode-locked pulses in the time domain.

Figure 6:
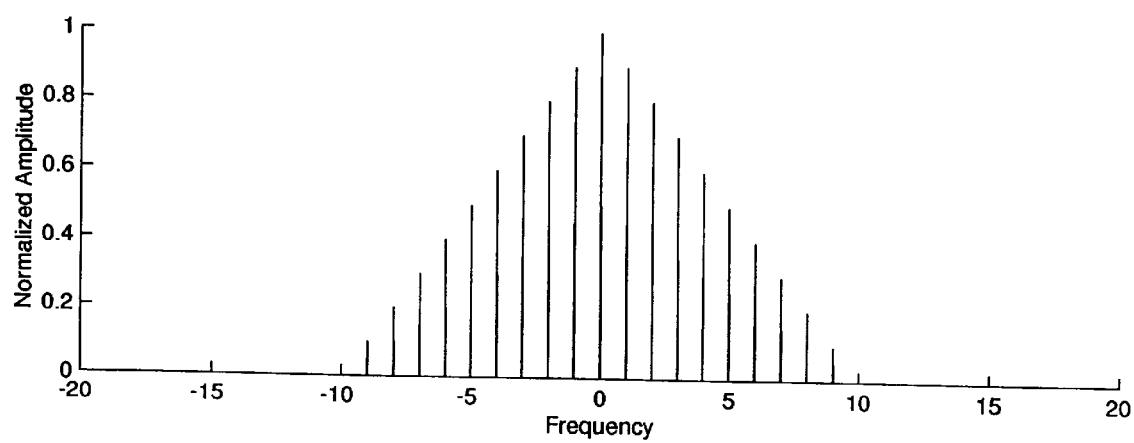
FIG. 6 is a frequency versus amplitude plot of a tapered distribution of carrier signals.

FIG. 6 is a plot of the spectral profile of a sequence of modes w(n) having incremental frequency spacing and amplitude tapering toward the edges of the sequence. All of the tapered window-filter techniques reduce sidelobes at the expense of increasing the main-lobe width. For example, the generalized Hanning window can be interpreted as a class of windows obtained as a weighted sum of a rectangular window and shifted versions of the rectangular window. The shifted versions add together to cancel the sidelobe structure at the expense of creating a broader main lobe. Some other types of tapered window sequences used in finite impulse response (FIR) filter design that are also applicable to the present invention include triangular (Bartlett), Hamming, Kaiser, Chebyshev, and Gaussian windows. In the case where the excitation distribution sequence w(n) is controlled within the FSFC 100 (for example, this would be done in an active FSFC 100, which contains a gain medium), a frequency-discrimination device may be used, such as a thin etalon (not shown) or an optical filter (not shown), that provides variable attenuation with respect to wavelength. Also, a spatial filter (not shown) or mask (not shown) may be used inside the cavity 100 to attenuate certain frequencies of light relative to their spatial relationships inside the cavity 100. The optical-toRF signal converter may use a window filter to taper the optical distribution input into the converter or taper the RF distribution of the RF signal output from the converter. Other window filters such as frequency-selective or spatially selective variable gain or other forms of amplitude control may be applied to signals after being coupled out of the cavity 100.

Figure 7A:
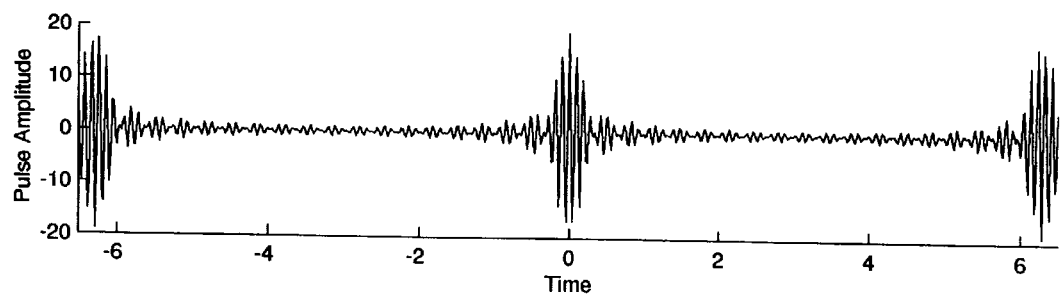
FIG. 7A is a plot of a time-domain pulse train resulting from the sum of 19 incrementally spaced-in-frequency carrier signals having uniform amplitude.
Figure 7B:
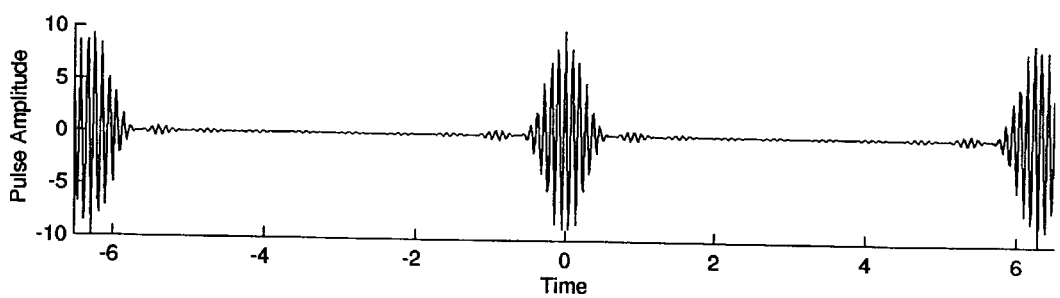
FIG. 7B is a plot of a time-domain pulse train resulting from the sum of 19 incrementally spaced-in-frequency carrier signals that are tapered in amplitude.

FIG. 7A illustrates the time-domain output of part of a pulse train generated by a rectangular frequency-versus-amplitude window of 19 incrementally spaced-in-frequency modes. The pulse amplitude and time axes represent arbitrary units. The modes are centered at a normalized frequency of $f_b=1000$ and have an incremental normalized frequency separation of $f_i=1$. Thus, each pulse appears as an envelope function around a (relatively) high-frequency carrier signal. FIG. 7B illustrates how a tapered window applied to the 19 modes reduces sidelobe height and expands the main-lobe width of the pulses for the same distribution of modes shown in FIG. 7A.

Figure 8:
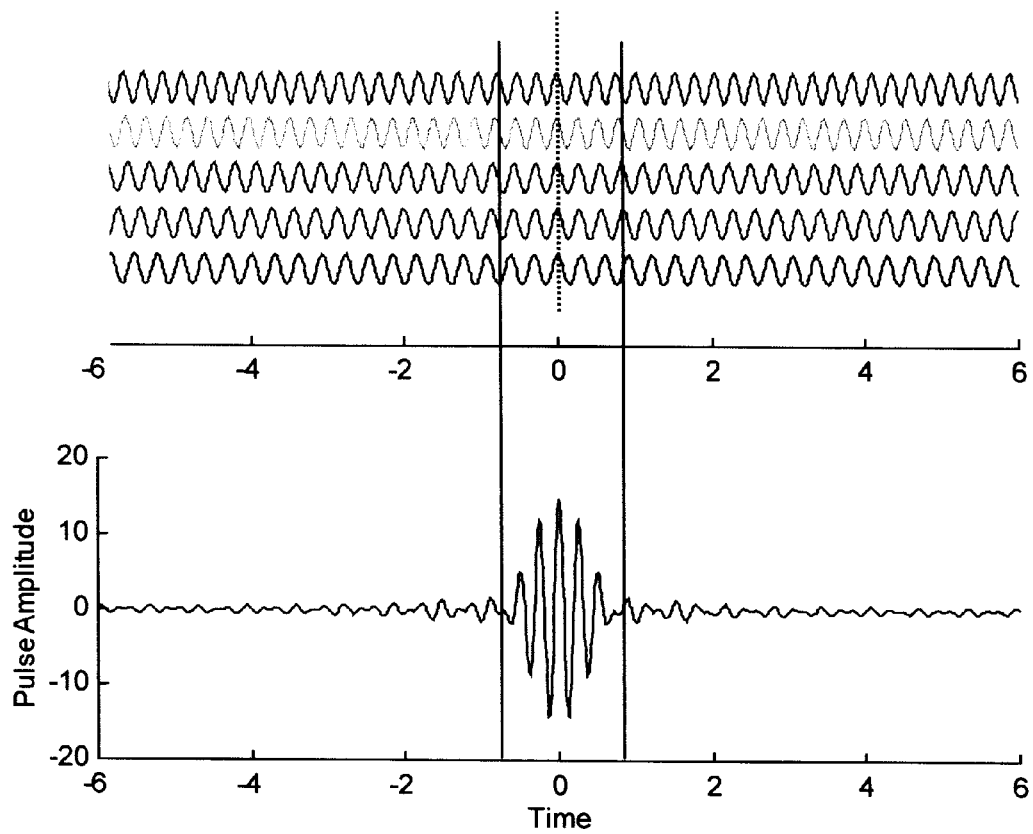
FIG. 8 is a plot of five of ten incrementally spaced-in-frequency carrier signals and a signal representing the sum of the ten carrier signals.

FIG. 8 shows five of the ten incremental-frequency carrier signals that combine to create a time-domain pulse. The pulse occurs between arbitrary time indices of −1 and 1, centered at time=0. At time=0, each of the carrier signals has a maximum, thus resulting in a pulse-amplitude maximum. Elsewhere, such as at time=2, the difference in frequency between the carrier signals results in time offsets between the maxima of the carriers. This causes the carriers to combine destructively, resulting in an approximately null signal. Therefore, a receiver that is tuned to these carrier signals does not detect a signal (except perhaps some residual sidelobe radiation) even though the carriers exist. Also, the receiver may be tuned to a tapered frequency response around the center of the carrier frequencies in order to reduce the sidelobes of the received pulse.

The time-domain length of each carrier signal may be longer than the width of each time-domain pulse because the cancellation of the carriers in the time intervals between each pulse results in a substantially null response from the receiver. In the system shown in FIG. 1, the time-domain length of the frequency-shifted transmit signals $S_{T_n}$ output from the FSFC 100 is determined by the pulse length of the transmit seed signal. One advantage to using relatively long carrier-signal lengths compared to the pulse width is that although the receiver response is null, a time sampling of each of the carrier signals in the null time intervals yields amplitude and timing information about the pulse. A receiver may provide a predetermined delay to each carrier signal that it receives in order to extract a pulse signal from the carriers. The delay between carriers depends on the difference in wavelength between the carriers scaled by the absolute value of time away from the time=0. For carriers having incremental frequencies $f_i$ and base frequency $f_b$, the difference in wavelength between adjacent carriers is:

$$\lambda_i = cf_i/(f_b+f_i),$$

where c is the speed of light.

If the base frequency $f_b$ is very large with respect to the bandwidth (which is defined by $N \cdot f_i$, where N is the number of carrier signals), $\lambda_i$ is substantially constant with respect to i, and the delay is approximately incremental. The FSFC 100 could be used to apply incremental delays to the received carrier signals. The concept of using a predetermined delay relationship between received carrier signals that have limited time-domain lengths is important in that it provides a means of multiple access based on timing of the carrier signals and delay profiles of the receivers. This technique also reduces reception of communication signals by broadband receivers that do not apply delay relationships to received carrier signals.

In the case where each carrier signal is transmitted by a single element of the array 150, the delay relationships between the carriers received at a remote location also depends on the azimuth angle of the remote receiver relative to the array 150. Thus, a receiver tuned to a predetermined delay relationship between the carrier signals does not receive information embedded in the delay relationship between the carriers if the transmitting array 150 is located at a different azimuth angle than to that which the receiver is tuned. This provides an additional level of source verification and anti-spoofing to the communication-security protocol.

CIMA utilizes the TDM protocol for multiple access. In the system shown in FIG. 1, the transmit seed signal has its delay set to provide a predetermined phase relationship between the transmitted carrier signals in one or more specific time slots. CIMA has an advantage over DS-CDMA in that the TDM aspect of CIMA limits co-channel interference to neighboring time slots, whereas DS-CDMA users distribute co-channel interference over the entire channel. Accordingly, a CIMA receiver (such as receiver 148) may receive its intended signal at an assigned time slot and sample the signals in adjacent time slots to produce a cancellation signal, which cancels signals that leak from the adjacent time slots. Because interference between the carriers results in the baseband information signal, the receiver 148 design is much simpler than a conventional receiver design because it does not require a demodulation system.

In addition to TDM, the channel capacity of CIMA may be expanded by the use of frequency-division multiplexing. Because the baseband information signals result from interference between carrier signals having a specific mode structure and phase relationship, any group of carrier signals that exhibit the same mode structure and phase relationship may be used to carry the information signals. This means that although two or more information signals may occupy the same time slot, they may be separated by the frequencies of their corresponding carriers. Thus a receiver equipped with frequency-selective filters accepts only those CIMA signals that are intended for that receiver. Furthermore, the signal levels at the outputs of the filters may be monitored and selectively attenuated to reduce narrow-band interference or may be selectively enhanced to compensate for absorptive losses in the transmission path.

Time-offset multiplexing (TOM) may be used as a form of TDM. In TOM, baseband information is correlated to a predetermined constellation of time offsets that occur around a given time interval. The time-domain location of received pulses is mapped to the constellation of offsets to decipher the data sent. One advantage of TOM is that pulses that are time offset tend to help smooth out the comb-like structure in the frequency spectrum that results from periodic pulses in the time domain.

CIMA transmissions are controlled in the frequency domain. Because CIMA depends on the relationship of carrier-signal phases and frequencies with respect to each other, it is possible to smooth out the frequency-spectrum comb structure by pseudo-randomly dithering the frequency of each of the carrier signals. In the system shown in FIG. 1, each of the frequency-shifted transmit signals $S_{Tn}$ coupled out of the FSFC 100 may be similarly dithered in frequency by a multi-channel AOM (not shown) that applies a pseudo-random frequency shift with respect to time to all of the frequency-shifted transmit signals $S_{Tn}$.

Figure 9A:
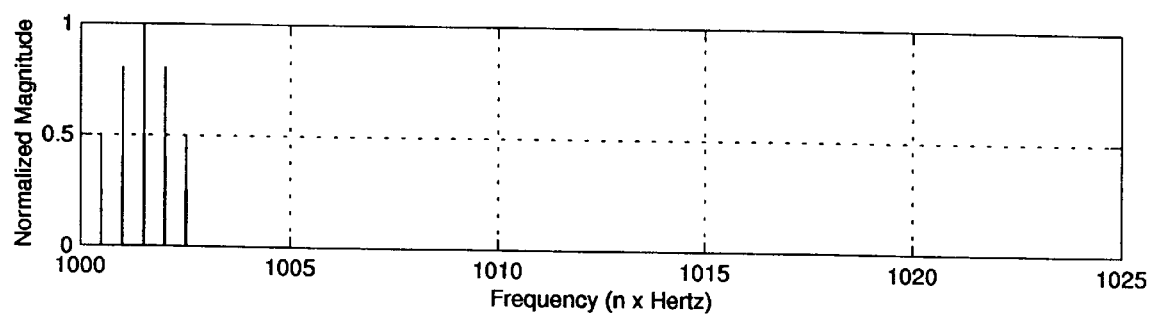
FIG. 9A is a frequency versus amplitude plot of a group of five carrier signals having discreet incrementally-spaced frequencies.
Figure 9B:
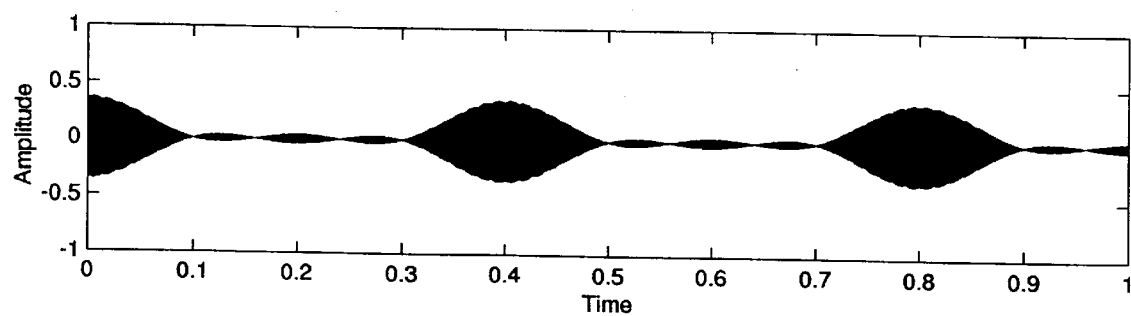
FIG. 9B is a plot of a time-domain pulse train created by the mode-locked sum of the carrier signals shown in FIG. 9A.

FIG. 9A shows the relative frequency spectrum of a group of five discreet-frequency modes. The modes are separated in frequency by the amount $f_i=0.5$ scaled by a constant n. The base frequency for each mode is $f_b=1000$ scaled by the constant n. In this case, the magnitudes of the five modes are tapered in order to reduce sidelobe levels in the time-domain sum of the modes shown in FIG. 9B. The pulses shown in FIG. 9B are envelopes that encompass a periodic signal structure whose frequency is approximately $f_b=1000$ scaled by the constant n. The time axis shown in FIG. 9B has an undefined scale with respect to time due to the undefined constant multiplier n. However, the period of the pulses is determined by the frequency separation $f_i$ between the modes. Increasing the separation between the modes results in decreasing the pulse repetition rate. Increasing mode separation in the system shown in FIG. 1 is accomplished by increasing the shift frequency $f_s$ of the AOM 107. Increasing the width of the mode group by adding more modes decreases the width of the time-domain pulse. This may be accomplished by expanding the spectral capabilities of the gain medium in the case of an active FSFC 100 or by increasing the intensity or number of transmit seed signals coupled into the FSFC 100.

Figure 10A:
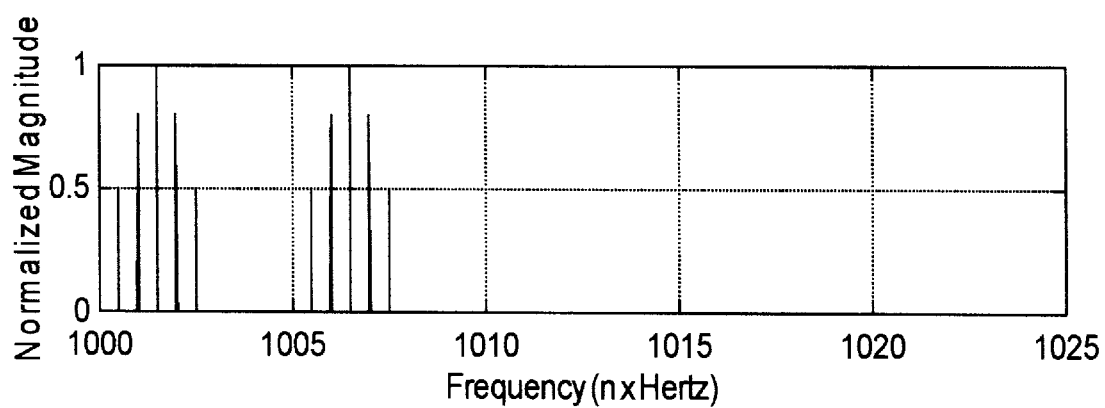
FIG. 10A is a frequency versus amplitude plot of two groups of carrier signals having discreet incrementally-spaced frequencies, the groups being separated from each other in the frequency domain.
Figure 10B:
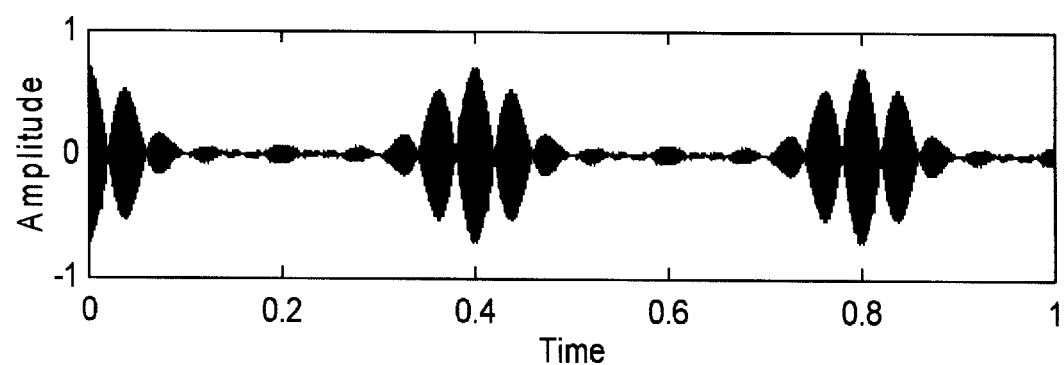
FIG. 10B is a plot of a time-domain pulse train created by the mode-locked sum of the carrier signals shown in FIG. 10A wherein the pulses contain fringes.

FIG. 10A shows the frequency spectrum of a pair of mode groups, each having similar mode separations $f_i$ and base frequencies $f_b$ as the modes shown in FIG. 9A. The mode groups are separated by a relative mode-group separation frequency $f_{gs}=3$ (n×Hertz). FIG. 10B illustrates approximately five fringes occurring in each of the pulse envelopes. The fringe patterns in the pulse envelopes result from multiple mode groups having a distinct group separation. The system shown in FIG. 1 may be used to generate fringes within the pulse envelopes by inserting multiple frequency-separated transmit seed signals into the FSFC 100. This generates multiple mode groups provided that the losses within the FSFC are great enough to significantly attenuate the amplitudes of frequency-shifted seed signals so that the frequency-shifted seed signals do not completely fill the spectrum between the frequency-separated transmit seed signals.

Figure 11A:
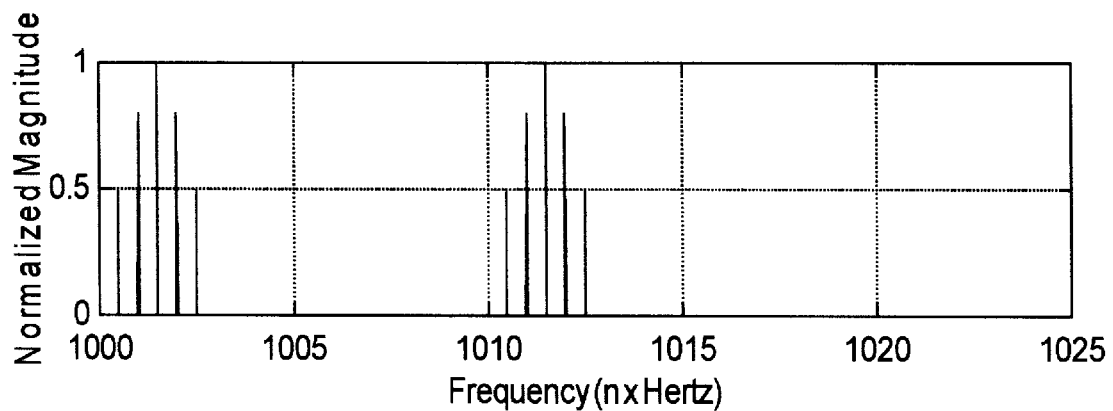
FIG. 11A is a frequency versus amplitude plot of two groups of carrier signals having discreet incrementally-spaced frequencies, the groups being separated from each other in the frequency domain by an amount that is greater than the group separation shown in FIG. 10A.
Figure 11B:
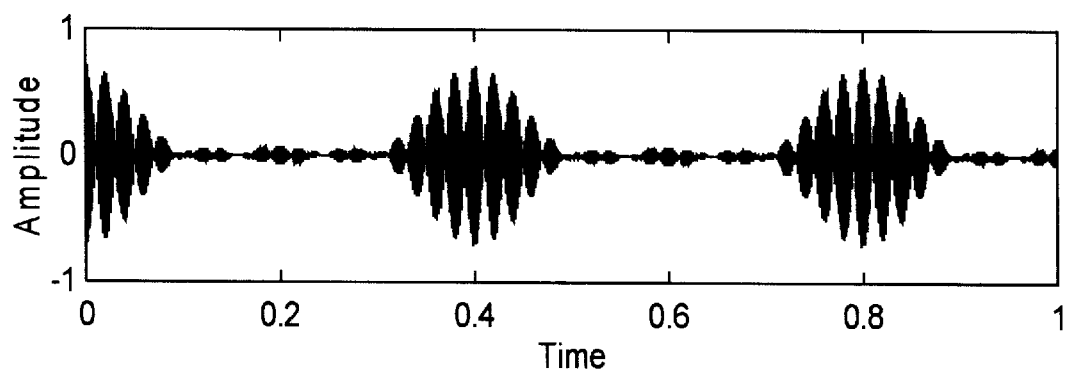
FIG. 11B is a plot of a time-domain pulse train created by the mode-locked sum of the carrier signals shown in FIG. 11A wherein the pulses contain fringes.

FIG. 11A and FIG. 11B show how increasing the group separation frequency $f_{gs}$ between mode groups causes more fringes to occur in the pulse envelopes. In the system shown in FIG. 1, increasing group separation frequency $f_{gs}$ is accomplished by increasing the frequency separation of the transmit seed signals. It is important to note that the shape of the pulse envelope does not change with increasing group separation, only the number of fringes within the envelope changes.

Figure 12A:
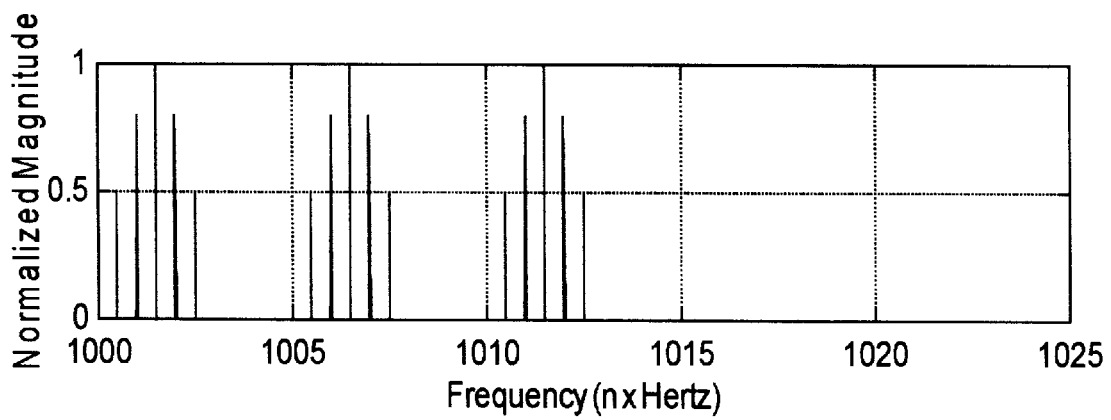
FIG. 12A is a frequency versus amplitude plot of three groups of carrier signals having discreet incrementally-spaced frequencies, the groups being separated from each other in the frequency domain by an amount that is equal to the group separation shown in FIG. 10A.
Figure 12B:
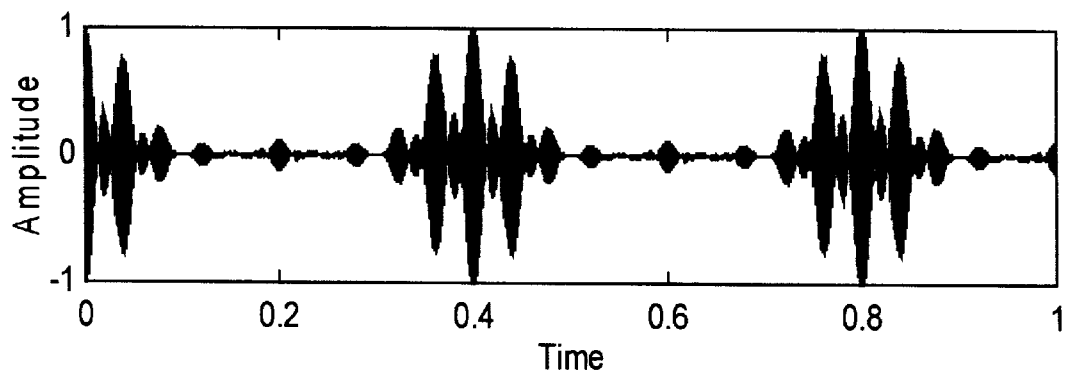
FIG. 12B is a plot of a time-domain pulse train created by the mode-locked sum of the carrier signals shown in FIG. 12A wherein the pulses contain fringes and sidelobes.

FIG. 12A and FIG. 12B shown relative to FIG. 10A and FIG. 10B illustrate the result of increasing the number of mode groups while maintaining the group separation frequency $f_{gs}$ between the groups. As the number of mode groups is increased, the fringes within the pulse envelopes become narrower and fringe sidelobes appear. Tapering the amplitude of the groups on both edges of the frequency distribution reduces the fringe sidelobes at the expense of making the fringes wider.

The method of adjusting fringes that occur within the pulse envelopes provides a means for conveying multiple data bits within each pulse. Information streams are created by controlling the frequency distribution of the modes to convey different data bits in the output. In the cases shown in FIG. 10B through FIG. 12B, the fringe pattern is symmetrical. Summing out-of-phase pulses or fringes with the pulse envelope to cancel predetermined fringes within the pulse envelope may be performed to create asymmetrical fringe patterns and thus increase the amount of data sent.

Figure 13:
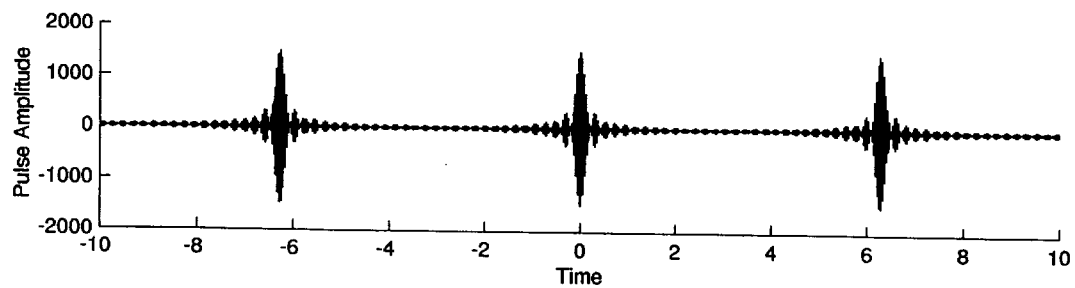
FIG. 13 is a time-domain plot illustrating periodic pulses resulting from the sum of a plurality of incrementally spaced discreet-frequency carrier signals.
Figure 14:
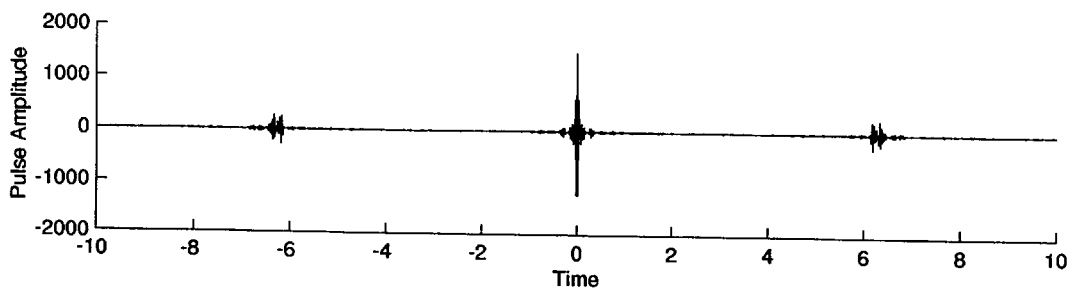
FIG. 14 is a time-domain plot resulting from a phase-locked sum of a plurality of non-incrementally spaced-in-frequency carrier signals.
Figure 15:
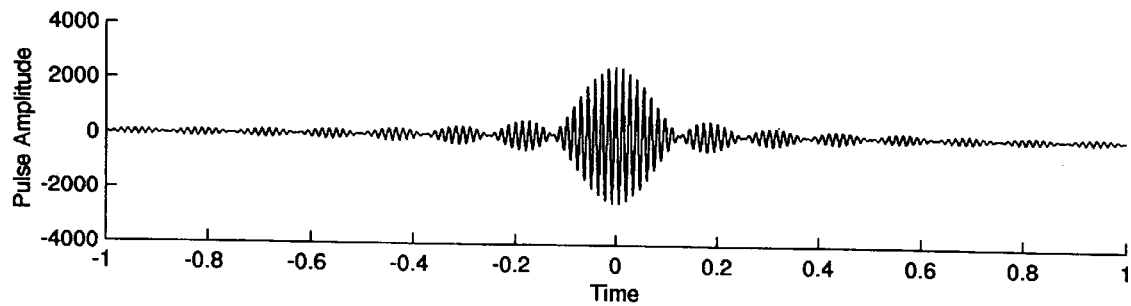
FIG. 15 is a time-domain plot showing sidelobes surrounding a pulse resulting from the sum of a plurality of incrementally spaced discreet-frequency carrier signals.
Figure 16:
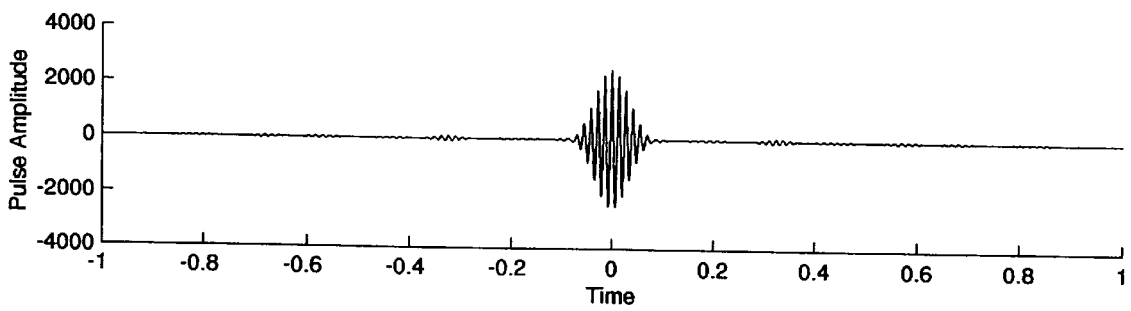
FIG. 16 is a time-domain plot showing amplitude-reduction in the sidelobes surrounding a pulse resulting from a phase-locked sum of a plurality of non-incrementally spaced-in-frequency carrier signals.

Another type of CIMA includes non-incrementally spacing the frequency intervals $f_i$ of the transmitted carrier signals. Non-incremental spacing of the separation frequencies $f_i$ includes non-redundant spacing, random spacing, and continuous frequency over selected frequency bands. FIG. 13 shows periodic time-domain pulses resulting from the sum of incrementally spaced carrier signals. The carrier signal frequencies are phased so their maxima coincide at a given time interval, time=0, constructively adding to create a pulse. The incremental spacing in frequency between the carriers causes the maxima of the carriers to coincide periodically. FIG. 14 shows how non-incremental spacing of the carrier frequencies attenuates the amplitude of pulses that occur away from the time interval, time=0. FIG. 15 shows sidelobes that occur due to minor constructive additions of the incrementally spaced carrier frequencies, whereas FIG. 16 shows a reduction in the magnitude of minor constructive additions that occur when the carrier frequencies are not incrementally spaced. In the system shown in FIG. 1, non-incremental spacing of the frequency-shifted transmit signals $S_{Tn}$ may be accomplished by non-redundantly or randomly spacing the transmit seed signal or by inserting a broadband transmit seed signal into the FSFC 100. Sending multiple or repeated pulses requires repeating the phase relationship between the carrier signals, which results in constructive interference.

Figure 17:
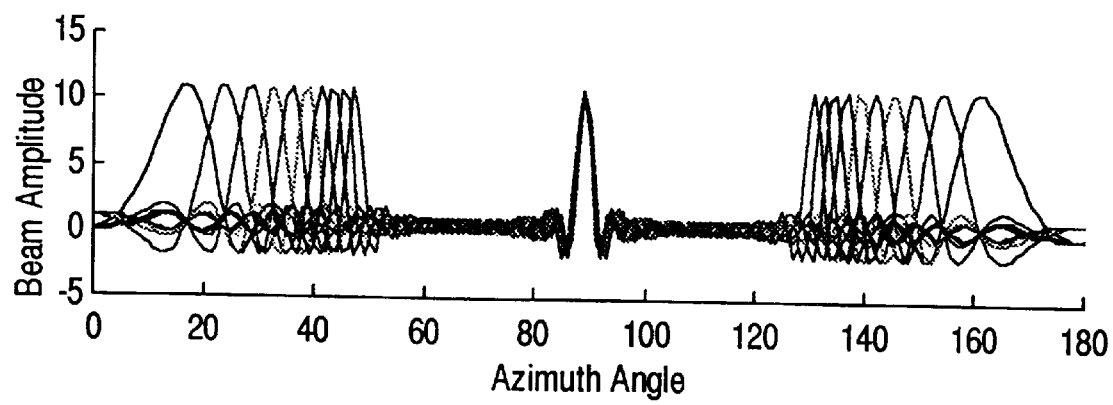
FIG. 17 is a plot of an antenna beam pattern for each of ten incrementally spaced discreet-frequency carrier signals.
Figure 18:
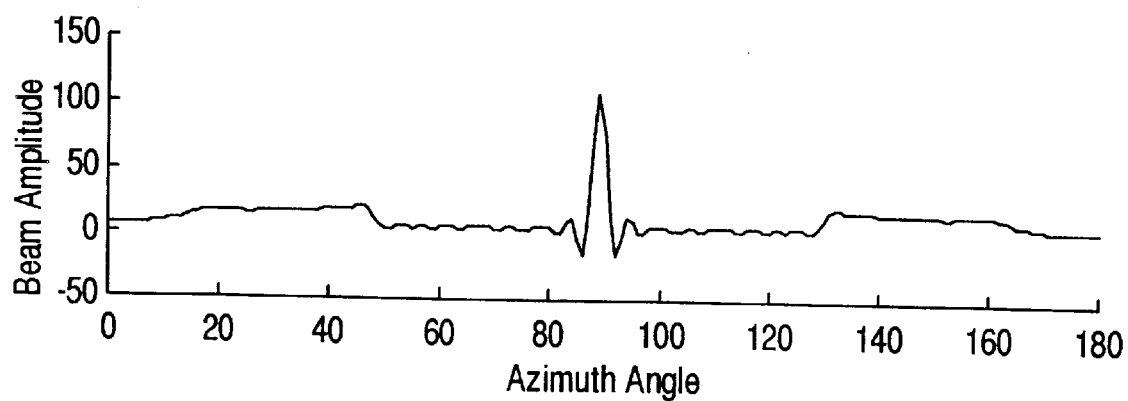
FIG. 18 is a plot of an antenna beam pattern resulting from the sum of ten incrementally spaced discreet-frequency carrier signals.

The broadband aspects of CIMA provide benefits to antenna arrays, such as reducing much of the sidelobe magnitude of the antenna-array patterns compared to narrow-band operation and reducing secondary main lobes. FIG. 17 shows the antenna-array array patterns for ten incrementally spaced-in-frequency carrier signals. FIG. 18 shows the antenna-array patterns for the sum of the ten patterns shown in FIG. 17.

In the preferred embodiment shown in FIG. 1, the FSFC 100 provides the means for generating frequency-shifted transmit signals $S_{Tn}$, which are down-converted into CIMA signals and transmitted from the antenna 150. This preferred embodiment demonstrates only one of many methods for generating CIMA signals in order to provide a basic understanding of the characteristics of CIMA. With respect to this understanding, many aspects of this invention may vary, such as in accordance with the methods used to create CIMA signals. In this regard, it should be understood that such variations will fall within the scope of the present invention, its essence lying more fundamentally with the design realizations and discoveries achieved than merely the particular designs developed.

The foregoing discussion and the claims which follow describe the preferred embodiments of the present invention. Particularly with respect to the claims, it should be understood that changes may be made without departing from the essence of the invention. In this regard, it is intended that such changes would still fall within the scope of the present invention. It is simply not practical to describe and claim all possible revisions to the present invention which may be accomplished. To the extent such revisions utilize the essence of the present invention, each naturally falls within the breadth of protection encompassed by this patent. This is particularly true for the present invention since its basic concepts and understandings are fundamental in nature and can be broadly applied.

I claim:

1. An optical array processor for a full-duplex RF antenna array comprising a plurality of antenna array elements responsive to incident RF radiation for generating a plurality of RF receive signals, an RF-to-optical signal converter for converting the RF receive signals into a plurality of optical receive signals, a FSFC having a predetermined round-trip length, said FSFC being optically coupled to said RF-to-optical converter for circulating the optical receive signals to provide at least one predetermined delay to each of the optical receive signals, a frequency shifter located inside said FSFC to shift the frequency of the optical receive signals by a predetermined shift frequency for generating a plurality of frequency-shifted receive signals, the shift frequency of said frequency shifter and the round-trip length of said FSFC providing a predetermined relationship between wavelength and delay for each of the frequency-shifted receive signals, a receive-beam wavelength demultiplexer optically coupled to said FSFC for coupling a portion of the frequency-shifted receive signals out of said FSFC and selecting at least one signal wavelength, each signal wavelength representing a plurality of the RF receive signals frequency shifted and delayed by a predetermined set of sequential amounts, providing a viewing angle signal, and a receiver coupled between said receive-beam wavelength demultiplexer and said antenna array for receiving at least one viewing angle signal, an injection source optically coupled to said FSFC for injecting an optical transmit seed signal into said FSFC, the seed signal being frequency shifted by said frequency shifter and incurring delay while circulating through said FSFC for providing a plurality of frequency-shifted transmit signals, an output-beam wavelength demultiplexer optically coupled to said FSFC for coupling a portion of the frequency-shifted transmit signals out of said FSFC and separating the frequency-shifted transmit signals with respect to wavelength to produce a plurality of wavelength-demultiplexed transmit signals, and an optical-to-RF signal converter coupled between said output-beam wavelength demultiplexer and said antenna array for converting the demultiplexed transmit signals into a plurality of RF transmit signals, the RF transmit signals being radiated by said antenna array.

2. The optical array processor of claim 1 wherein the optical receive signals circulate in a direction opposite to the direction of circulation of the optical transmit signal inside of said FSFC.

3. The optical array processor of claim 1 wherein the optical receive signals have a different set of wavelengths with respect to the frequency-shifted transmit signals inside of said FSFC.

4. The optical array processor of claim 1 wherein said FSFC includes a gain medium.

5. An optical array processor for a transmitting RF antenna array comprising an injection source for generating an electromagnetic transmit seed signal, a FSFC having a predetermined round-trip length, said FSFC being optically coupled to the injection source for circulating the seed signal, thus providing delay to the seed signal, a frequency shifter located inside said FSFC to shift the frequency of the seed signal by a predetermined shift frequency for generating a plurality of frequency-shifted transmit signals, the shift frequency of said frequency shifter and the round-trip length of said FSFC providing a predetermined relationship between wavelength and delay of the frequency-shifted transmit signals, an output-beam wavelength demultiplexer optically coupled to said FSFC for coupling a portion of the frequency-shifted transmit signals out of said FSFC and separating the frequency-shifted transmit signals with respect to wavelength to produce a plurality of wavelength-demultiplexed transmit signals, and an optical-to-RF signal converter coupled between said output-beam wavelength demultiplexer and said antenna array for converting the wavelength-demultiplexed transmit signals into a plurality of RF transmit signals, the RF transmit signals being radiated by said antenna array.

6. The optical array processor of claim 5 wherein said optical-to-RF signal converter is an optical heterodyne device that generates one or more optical reference signals for combining with the wavelength-demultiplexed transmit signals to produce the plurality of RF transmit signals.

7. The optical array processor of claim 6 wherein said optical heterodyne device mixes the wavelength-demultiplexed transmit signals from a single-frequency reference source to produce a plurality of sequentially frequency-shifted RF signals.

8. The optical array processor of claim 5 wherein said injection source modulates the transmit seed signal with an information signal to provide a modulated transmit seed signal.

9. The optical array processor of claim 5 wherein said injection source dithers the wavelength of the seed signal to smooth out comb structures in the frequency spectrum of the RF transmit signal.

10. The optical array processor of claim 5 wherein said frequency shifter dithers the shift frequency applied to the seed signal to smooth out comb structures in the frequency spectrum of the RF transmit signal.

11. The optical array processor of claim 5 wherein said optical-to-RF signal converter includes a window filter for tapering the amplitude distribution of the wavelength-demultiplexed transmit signals with respect to signal frequency.

12. The optical array processor of claim 5 wherein said FSFC includes a gain medium.

13. The optical array processor of claim 5 wherein the delay provided by said FSFC to the seed signal is an incremental delay.

14. The optical array processor of claim 5 wherein the delay provided by said FSFC to the seed signal is dependent on the seed signal wavelength resulting in a non-incremental delay.

15. The optical array processor of claim 5 wherein said FSFC includes a cavity-length adjustment device for providing adjustment to the round-trip length of said FSFC.

16. The optical array processor of claim 5 wherein said FSFC includes a window filter for tapering the amplitude distribution of the shifted signals with respect to frequency.

17. An optical array processor for a receiving RF antenna array comprising
- a plurality of antenna array elements responsive to incident RF radiation for generating a plurality of RF receive signals,
- an RF-to-optical signal converter for converting the RF receive signals into a plurality of optical receive signals,
- a FSFC having a predetermined round-trip length, said FSFC being optically coupled to said RF-to-optical converter for circulating the optical receive signals to provide at least one predetermined delay to each of the optical receive signals,
- a frequency shifter located inside said FSFC to shift the frequency of the optical receive signals by a predetermined shift frequency for generating a plurality of frequency-shifted receive signals, the shift frequency of said frequency shifter and the round-trip length of said FSFC providing a predetermined relationship between wavelength and delay for each of the frequency-shifted receive signals,
- a receive-beam wavelength demultiplexer optically coupled to said FSFC for coupling a portion of the frequency-shifted receive signals out of said FSFC and selecting at least one signal wavelength, each signal wavelength representing a plurality of the RF receive signals frequency shifted and delayed by a predetermined set of sequential amounts, providing a viewing angle signal, and
- a receiver coupled between said receive-beam wavelength demultiplexer and said antenna array for receiving at least one viewing-angle signal.

18. The optical array processor of claim 17 wherein said receiver simultaneously processes multiple viewing-angle signals for viewing in multiple directions.

19. The optical array processor of claim 17 wherein said RF-to-optical signal converter includes a window filter for tapering the amplitude distribution of the optical receive signals with respect to frequency.

20. The optical array processor of claim 17 wherein said FSFC includes a gain medium.

21. The optical array processor of claim 17 wherein the delay provided by said FSFC to the optical receive signals is an incremental delay.

22. The optical array processor of claim 17 wherein the delay provided by said FSFC to the optical receive signals is a non-incremental delay that depends on the optical receive signal wavelength.

23. The optical array processor of claim 17 wherein said FSFC includes a cavity length adjustment device for providing adjustment to the round-trip length of said FSFC, thus providing adjustment to the direction of the incident RF radiation to which the receiver is sensitive.

24. The optical array processor of claim 17 wherein said FSFC includes a window filter for tapering the amplitude distribution of the shifted signals with respect to frequency.

25. A method for sequentially exciting a plurality of array elements of a transmitting antenna array, the method comprising the steps of:
- providing at least one electromagnetic transmit seed signal to a traveling wave cavity,
- providing a plurality of sequential delays to the seed signal by circulating the seed signal in the traveling-wave cavity for generating a plurality of delayed transmit signals,
- providing a plurality of frequency shifts to the delayed transmit signals, the frequency shifts being sequential with respect to the amount of delay incurred by each of the delayed transmit signals for producing a plurality of frequency-shifted transmit signals,
- providing wavelength-demultiplexing to a portion of the frequency-shifted transmit signals coupled out of the traveling-wave cavity for producing a plurality of wavelength-demultiplexed transmit signals, and
- providing one or more radiative transmit signals to each of the array elements, the radiative transmit signals being controlled by the wavelength-demultiplexed transmit signals and radiated by the array.

26. A method for sequentially exciting a plurality of array elements of a receiving antenna array, the method comprising the steps of:
- providing for reception of incident electromagnetic radiation by a spatially distributed array of receiver elements, the received radiation being converted into a plurality of received signals,
- providing wavelength-multiplexing of the received electrical signals to combine the received electrical signals into a plurality of wavelength-multiplexed receive signals,
- providing a plurality of sequential delays to the wavelength-multiplexed signals by circulating the wavelength-multiplexed signals in a traveling-wave cavity to generate a plurality of delayed receive signals,
- providing a plurality of frequency shifts to the delayed receive signals to produce a plurality of frequency-shifted receive signals, the frequency shifts being sequential with respect to the amount of delay incurred by each delayed receive signal, and the frequency-shifted receive signals including one or more composite signals, the composite signals being distinguished by wavelength and being comprised of a sum of the frequency-shifted receive signals having a specific sequential delay profile that is related to the wavelength of the composite signal, and
- providing for separation of one or more of the composite signals from the wavelength-multiplexed received signals for reception by a receiver.

27. A receiver for collecting time samples of incident electromagnetic radiation received by an antenna, the incident electromagnetic radiation having been modulated by an information signal, the receiver comprising:
- a frequency shifted feedback cavity (FSFC) for receiving an optical receive signal converted from the electromagnetic signals received by the antenna, the optical receive signal bearing modulation by the information signal, the FSFC including a traveling wave cavity through which the optical receive signal is circulated for providing delay to the optical receive signal, and a frequency-shifting device for frequency shifting the optical receive signals upon each round trip through the cavity,
- an output coupler for coupling a portion of the delayed, frequency-shifted optical receive signals out of the FSFC,
- a wavelength-demultiplexer for spatially separating by wavelength the output delayed, frequency-shifted optical receive signals for producing a plurality of component receive signals, each of the component receive signals representing a unique time sample of the incident electromagnetic radiation, and a demodulator for converting at least one of the component receive signals into an electrical receive signal representing the information signal.

28. A method of collecting a plurality of time samples of incident RF radiation modulated by an information signal and received by an antenna, said method comprising the steps of:

providing optical conversion of the received RF radiation into at least one optical receive signal, the optical receive signal being modulated by the information signal, providing a plurality of delays to the optical receive signal for producing a plurality of delayed receive signals, providing frequency shifting to each of the delayed receive signals for producing a plurality of frequency-shifted delayed receive signals, the amount of frequency shifting being proportional to the amount of delay incurred by each delayed receive signal, providing wavelength-demultiplexing to at least a portion of the frequency-shifted delayed receive signals for producing a plurality of component receive signals spatially separated with respect to frequency, each of the component receive signals representing a unique sampling in time of the incident RF radiation, and providing reception of at least one of the component receive signals for converting each component receive signal into an electrical receive signal representing the information signal.

29. The method of collecting a plurality of time samples of incident RF radiation modulated by an information signal and received by an antenna recited in claim 28 wherein the step of providing reception of the component receive signals includes summing the component receive signals to combine the energy of received multipath RF radiation.

30. The method of collecting a plurality of time samples of incident RF radiation modulated by an information signal and received by an antenna recited in claim 28 wherein the delays provided to the optical receive signals are adjustable and the step of providing a plurality of delays to the optical receive signal further includes adjusting the delays, resulting in adjustment of the sampling time of the incident RF radiation.

31. The method of collecting a plurality of time samples of incident RF radiation modulated by an information signal and received by an antenna recited in claim 28 wherein the received RF radiation includes a plurality of discreet-frequency carrier signals, the step of providing optical conversion of the received RF radiation includes a step of providing frequency separation to the received RF radiation to separate by frequency the plurality of discreet-frequency carrier signals and convert each of the separated discreet-frequency carrier signals into at least one optical receive signal having a unique optical frequency, and the step of providing a plurality of delays to the optical receive signals provides a predetermined total amount of delay to each of the optical receive signals with respect to the optical receive signal frequency.

* * * * *